United States Patent
Hayano et al.

(10) Patent No.: US 12,018,116 B2
(45) Date of Patent: Jun. 25, 2024

(54) HYDROGENATED RING-OPENED POLYMER, RESIN COMPOSITION, AND SHAPED PRODUCT

(71) Applicant: ZEON CORPORATION, Tokyo (JP)

(72) Inventors: Shigetaka Hayano, Tokyo (JP); Hideyuki Kanda, Tokyo (JP); Taichi Sawaguchi, Tokyo (JP); Yuki Nakama, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 534 days.

(21) Appl. No.: 17/593,254

(22) PCT Filed: Mar. 10, 2020

(86) PCT No.: PCT/JP2020/010366
§ 371 (c)(1),
(2) Date: Sep. 14, 2021

(87) PCT Pub. No.: WO2020/195801
PCT Pub. Date: Oct. 1, 2020

(65) Prior Publication Data
US 2022/0153924 A1 May 19, 2022

(30) Foreign Application Priority Data
Mar. 27, 2019 (JP) .................. 2019-061488

(51) Int. Cl.
C08G 61/08 (2006.01)
C08L 65/00 (2006.01)

(52) U.S. Cl.
CPC ............. C08G 61/08 (2013.01); C08L 65/00 (2013.01); C08G 2261/3324 (2013.01); C08G 2261/418 (2013.01)

(58) Field of Classification Search
None
See application file for complete search history.

(56) References Cited

U.S. PATENT DOCUMENTS

| | | | |
|---|---|---|---|
| 6,197,894 B1 | 3/2001 | Sunaga et al. | |
| 10,351,664 B2 * | 7/2019 | Kato | C08K 3/013 |
| 11,807,712 B2 * | 11/2023 | Nakama | C08G 61/08 |
| 2007/0185290 A1 * | 8/2007 | Hayano | C08G 61/08 526/172 |
| 2016/0264721 A1 * | 9/2016 | Hayano | C08G 61/08 |

FOREIGN PATENT DOCUMENTS

| | | |
|---|---|---|
| EP | 3778695 A1 | 2/2021 |
| JP | H072929 A | 1/1995 |
| JP | H07149823 A | 6/1995 |
| JP | H11158256 A | 6/1999 |
| JP | H11193323 A | 7/1999 |
| JP | H11209460 A | 8/1999 |
| JP | 2002249553 A | 9/2002 |
| JP | 2007137935 A | 6/2007 |
| JP | 2014148634 A | 8/2014 |
| WO | 2015127192 A1 | 8/2015 |
| WO | 2019188720 A1 | 10/2019 |

OTHER PUBLICATIONS

Benjamin Autenrieth et al., Stereospecific Ring-Opening Metathesis Polymerization (ROMP) of endo-Dicyclopentadiene by Molybdenum and Tungsten Catalysts, Macromolecules, 2015, pp. 2480-2492, vol. 48, No. 8.

Benjamin Autenrieth et al., Stereospecific Ring-Opening Metathesis Polymerization (ROMP) of Norbornene and Tetracyclododecene by Mo and W Initiators, Macromolecules, Apr. 7, 2015, pp. 2493-2503, vol. 48.

Sep. 28, 2021, International Preliminary Report on Patentability issued in the International Patent Application No. PCT/JP2020/010366.

Nov. 24, 2022, the Extended European Search Report issued by the European Patent Office in the corresponding European Patent Application No. 20776627.0.

John P. Bishop et al., The Crystal-Crystal Transition in Hydrogenated Ring-Opened Polynorbornenes: Tacticity, Crystal Thickening, and Alignment, Journal of Polymer Science Part B: Polymer Physics, Jan. 1, 2011, pp. 68-79, vol. 49.

Shigetaka Hayano et al., Iso- and Syndio-Selective ROMP of Norbornene and Tetracyclododecene: Effects of Tacticity Control on the Hydrogenated Ring-Opened Poly(cycloolefin)s, Macromolecules, Nov. 25, 2014, pp. 7797-7811, vol. 47.

* cited by examiner

Primary Examiner — Satya B Sastri
(74) Attorney, Agent, or Firm — KENJA IP LAW PC

(57) ABSTRACT

Provided is a hydrogenated ring-opened polymer having excellent ductility. The hydrogenated ring-opened polymer includes 90 mass % or more of norbornene-derived structural units. The proportion of meso diads of cis-structural units (I) of formula (I), shown below, included among the norbornene-derived structural units is not less than 0% and not more than 30% or is not less than 70% and not more than 100%. Trans-structural units (II) of formula (II), shown below, constitute a proportion of not less than 0.5% and not more than 20% among the total of the cis-structural units (I) of formula (I) and the trans-structural units (II) of formula (II).

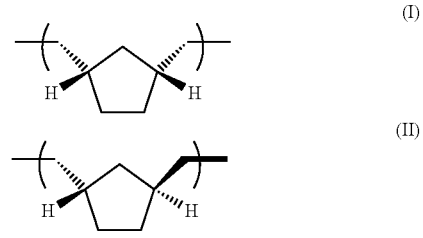

5 Claims, No Drawings

HYDROGENATED RING-OPENED POLYMER, RESIN COMPOSITION, AND SHAPED PRODUCT

TECHNICAL FIELD

The present disclosure relates to a polymer obtained through hydrogenation of a ring-opened polymer (i.e., relates to a hydrogenated ring-opened polymer). The present disclosure also relates to a resin composition containing a hydrogenated ring-opened polymer and a shaped product obtained through shaping of a resin composition.

BACKGROUND

Polymers (hydrogenated ring-opened polymers) that are obtained by performing ring-opening polymerization of a monomer composition containing norbornene to obtain a ring-opened polymer and then subjecting the ring-opened polymer to hydrogenation treatment are used in a wide range of fields as optical materials, medical tools and materials, electrically insulating materials, electronic component processing tools and materials, and so forth due to having an excellent balance of various characteristics such as heat resistance, transparency, light resistance, water absorption resistance, moisture resistance, chemical resistance, solvent resistance, dielectric characteristics, low birefringence, rigidity, and laser resistance.

Studies have been made to further improve the performance of hydrogenated ring-opened polymers that include norbornene-derived structural units (for example, refer to Patent Literature (PTL) 1).

PTL 1 discloses a hydrogenated norbornene-based ring-opened polymer that includes 1 weight % to 15 weight % of structural units derived from a norbornene-based monomer, 15 weight % to 50 weight % of structural units derived from a tetracyclododecene-based monomer, and 50 weight % to 90 weight % of structural units derived from a methanotetrahydrofluorene-based monomer, and that has a branching index of 0.7 to 0.9.

CITATION LIST

Patent Literature

PTL 1: JP2014-148634A

SUMMARY

Technical Problem

However, there has been demand for further improvement of hydrogenated ring-opened polymers in recent years. Specifically, there has been demand for causing hydrogenated ring-opened polymers to display even better ductility.

Accordingly, an object of the present disclosure is to provide a hydrogenated ring-opened polymer that has excellent ductility, a resin composition that contains this hydrogenated ring-opened polymer, and a shaped product that is formed using this resin composition.

Solution to Problem

The inventors conducted diligent investigation with the aim of solving the problem set forth above. The inventors discovered that a hydrogenated ring-opened polymer that includes norbornene-derived structural units in not less than a specific proportion while also having specific properties has excellent ductility, and, in this manner, completed the present disclosure.

Specifically, the present disclosure aims to advantageously solve the problem set forth above, and a presently disclosed hydrogenated ring-opened polymer comprises 90 mass % or more of norbornene-derived structural units, wherein a proportion of meso diads of structural units having a cis-1,3-cyclopentane structure indicated by formula (I), shown below, included among the norbornene-derived structural units is not less than 0% and not more than 30% or is not less than 70% and not more than 100%, and structural units having a trans-1,3-cyclopentane structure indicated by formula (II), shown below, constitute a proportion of not less than 0.5% and not more than 20% among a total of the structural units having the cis-1,3-cyclopentane structure indicated by formula (I) and the structural units having the trans-1,3-cyclopentane structure indicated by formula (II).

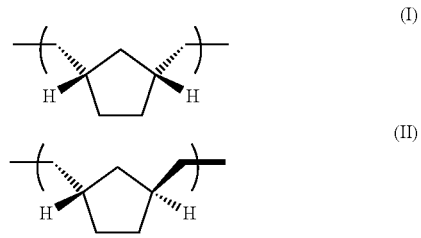

When a hydrogenated ring-opened polymer includes 90 mass % or more of norbornene-derived structural units, when the proportion of meso diads of structural units having a cis-1,3-cyclopentane structure indicated by the preceding formula (I) (hereinafter, also referred to as "cis-structural units (I)") included among the norbornene-derived structural units is not less than 0% and not more than 30% or is not less than 70% and not more than 100%, and when structural units having a trans-1,3-cyclopentane structure indicated by the preceding formula (II) (hereinafter, also referred to as "trans-structural units (II)") constitute a proportion of not less than 0.5% and not more than 20% among the total of the cis-structural units (I) and the trans-structural units (II) (hereinafter, this proportion is also referred to as the "isomerization rate") in this manner, the hydrogenated ring-opened polymer has excellent ductility.

Note that the proportion constituted by each type of structural unit among all structural units of a polymer such as a hydrogenated ring-opened polymer can be identified through NMR (nuclear magnetic resonance) measurement such as $^1$H-NMR measurement.

Moreover, the "proportion of meso diads" of cis-structural units (I) can be determined as the signal intensity for meso diads as a proportion relative to the total of the signal intensity for meso diads and the signal intensity for racemo diads as observed in $^{13}$C-NMR measurement. More specifically, the "proportion of meso diads" of "structural units having a cis-1,3-cyclopentane structure indicated by formula (I)" can be identified using a method described in the EXAMPLES section of the present specification.

Furthermore, the proportion constituted by trans-structural units (II) among the total of cis-structural units (I) and trans-structural units (II) (i.e., the isomerization rate) can be determined by $^{13}$C-NMR measurement. More specifically, the isomerization rate can be identified using a method described in the EXAMPLES section of the present specification.

The presently disclosed hydrogenated ring-opened polymer preferably has a weight-average molecular weight of not less than 10,000 and not more than 1,000,000. When the weight-average molecular weight is within the range set forth above, processability of the hydrogenated ring-opened polymer can be ensured while also further improving ductility of the hydrogenated ring-opened polymer.

Note that the "weight-average molecular weight" is a value measured by gel permeation chromatography (GPC) and, more specifically, can be measured using a method described in the EXAMPLES section of the present specification.

The presently disclosed hydrogenated ring-opened polymer may have a nickel content of not less than 0.5 mass ppb and not more than 50 mass ppm, for example, as measured by inductively coupled plasma atomic emission spectroscopy.

Note that the nickel content in a hydrogenated ring-opened polymer can be measured by inductively coupled plasma atomic emission spectroscopy (ICP-AES) as mentioned above and, more specifically, can be measured by a method described in the EXAMPLES section of the present specification.

Moreover, the present disclosure aims to advantageously solve the problem set forth above, and a presently disclosed resin composition comprises any one of the hydrogenated ring-opened polymers set forth above. By using a resin composition that contains any one of the hydrogenated ring-opened polymers set forth above, it is possible to obtain a shaped product having excellent ductility.

Furthermore, the present disclosure aims to advantageously solve the problem set forth above, and a presently disclosed shaped product is formed using the resin composition set forth above. A shaped product that is obtained through shaping of the resin composition set forth above has excellent ductility.

Advantageous Effect

According to the present disclosure, it is possible to provide a hydrogenated ring-opened polymer that has excellent ductility. Moreover, according to the present disclosure, it is possible to provide a resin composition that can form a shaped product having excellent ductility and also to provide a shaped product that has excellent ductility.

DETAILED DESCRIPTION

The following provides a detailed description of embodiments of the present disclosure.

The presently disclosed hydrogenated ring-opened polymer is a polymer that can be used in a variety of fields as a resin material forming various shaped products. Moreover, the presently disclosed resin composition contains the presently disclosed hydrogenated ring-opened polymer. Furthermore, the presently disclosed shaped product is obtained through shaping of the presently disclosed hydrogenated ring-opened polymer.

(Hydrogenated Ring-Opened Polymer)

The presently disclosed hydrogenated ring-opened polymer includes 90 mass % or more of norbornene-derived structural units. These norbornene-derived structural units include at least cis-structural units (I) indicated by formula (I), shown below, and trans-structural units (II) indicated by formula (II), shown below, that are obtained through hydrogenation of norbornene units.

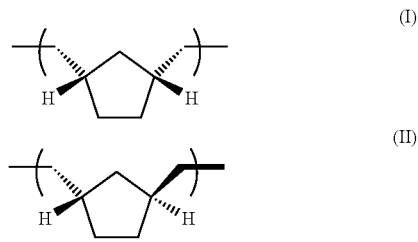

In the presently disclosed hydrogenated ring-opened polymer, the proportion of meso diads of cis-structural units (I) is not less than 0% and not more than 30% or is not less than 70% and not more than 100%, and the proportion constituted by trans-structural units (II) among the total of cis-structural units (I) and trans-structural units (II) (i.e., the isomerization rate) is not less than 0.5% and not more than 20%.

The hydrogenated ring-opened polymer having the properties set forth above can advantageously be used as a resin material of a shaped product due to having excellent ductility.

<Structural Units>

The presently disclosed hydrogenated ring-opened polymer includes at least structural units derived from norbornene as described above, and may optionally include structural units derived from monomers other than norbornene (i.e., other monomers).

<<Norbornene-Derived Structural Units>>

The hydrogenated ring-opened polymer is required to include 90 mass % or more of norbornene-derived structural units when all structural units are taken to be 100 mass %, and preferably includes 93 mass % or more, more preferably 96 mass % or more, and even more preferably 99 mass % or more of norbornene-derived structural units when all structural units are taken to be 100 mass %. When the proportion constituted by norbornene-derived structural units among all structural units of the hydrogenated ring-opened polymer is less than 90 mass %, ductility of the hydrogenated ring-opened polymer decreases. Moreover, gas barrier properties of the hydrogenated ring-opened polymer deteriorate due to lowering of the melting point and degree of crystallization of the hydrogenated ring-opened polymer.

Note that no specific limitations are placed on the upper limit for the proportion constituted by norbornene-derived structural units among all structural units of the hydrogenated ring-opened polymer, and this proportion can be 100 mass % or less.

<<Structural Units Derived From Other Monomers>>

No specific limitations are placed on other monomers that can be used in production of the hydrogenated ring-opened polymer so long as they can undergo ring-opening copolymerization with norbornene. Examples of other monomers that can be used include monomers other than norbornene that have a norbornene skeleton (hereinafter, referred to as "norbornene-based monomers"). Note that one other monomer may be used individually, or two or more other monomers may be used in combination.

Examples of norbornene-based monomers include norbornene-based monomers that do not have a ring that condenses with a norbornene ring (condensed ring-non-forming norbornene-based monomers) and norbornene-based monomers that do have a ring that condenses with a norbornene ring (condensed ring-forming norbornene-based monomers).

[Condensed Ring-Non-Forming Norbornene-Based Monomers]

Examples of condensed ring-non-forming norbornene-based monomers include norbornenes that include an alkyl group such as 5-methylnorbornene, 5-ethylnorbornene, 5-butylnorbornene, 5-hexylnorbornene, 5-decylnorbornene, 5-cyclohexylnorbornene, and 5-cyclopentylnorbornene; norbornenes that include an alkenyl group such as 5-ethylidenenorbornene, 5-vinylnorbornene, 5-propenylnorbornene, 5-cyclohexenylnorbornene, and 5-cyclopentenylnorbornene; norbornenes that include an aromatic ring such as 5-phenylnorbornene; norbornenes that include a polar group including an oxygen atom such as 5-methoxycarbonylnorbornene, 5-ethoxycarbonylnorbornene, 5-methyl-5-methoxycarbonylnorbornene, 5-methyl-5-ethoxycarbonylnorbornene, norbornenyl-2-methylpropionate, norbornenyl-2-methyloctanate, 5-hydroxymethylnorbornene, 5,6-di(hydroxymethyl)norbornene, 5,5-di(hydroxymethyl)norbornene, 5-hydroxyisopropylnorbornene, 5,6-dicarboxynorbornene, and 5-methoxycarbonyl-6-carboxynorbornene; and norbornenes that include a polar group including a nitrogen atom such as 5-cyanonorbornene. One of these monomers may be used individually, or two or more of these monomers may be used in combination.

[Condensed Ring-Forming Norbornene-Based Monomers]

Examples of condensed ring-forming norbornene-based monomers include monomers indicated by formula (III) and formula (IV), shown below.

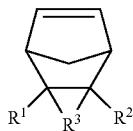

(III)

In formula (III), $R^1$ and $R^2$ each represent, independently of each other, a hydrogen atom, a halogen atom, an optionally substituted hydrocarbon group having a carbon number of not less than 1 and not more than 20, or a substituent including a silicon atom, an oxygen atom, or a nitrogen atom (excluding those corresponding to an optionally substituted hydrocarbon group having a carbon number of not less than 1 and not more than 20), and may be bonded to each other to form a ring. $R^3$ is an optionally substituted divalent hydrocarbon group having a carbon number of not less than 1 and not more than 20.

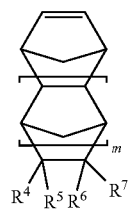

(IV)

In formula (IV), $R^4$, $R^5$, $R^6$, and $R^7$ each represent, independently of one another, a hydrogen atom, a halogen atom, an optionally substituted hydrocarbon group having a carbon number of not less than 1 and not more than 20, or a substituent including a silicon atom, an oxygen atom, or a nitrogen atom (excluding those corresponding to an optionally substituted hydrocarbon group having a carbon number of not less than 1 and not more than 20), and $R^4$ and $R^6$ may be bonded to each other to form a ring. Moreover, m is 1 or 2.

Examples of monomers indicated by the preceding formula (III) include dicyclopentadiene, methyldicyclopentadiene, dimethyldicyclopentadiene, tricyclo[5.2.1.0$^{2,6}$]dec-8-ene, tetracyclo[9.2.1.0$^{2,10}$.0$^{3,8}$]tetradeca-3,5,7,12-tetraene (also referred to as 1,4-methano-1,4,4a,9a-tetrahydro-9H-fluorene), and tetracyclo[10.2.1.0$^{2,11}$.0$^{4,9}$]pentadeca-4,6,8,13-tetraene (also referred to as 1,4-methano-1,4,4a,9,9a,10-hexahydroanthracene). One of these monomers may be used individually, or two or more of these monomers may be used in combination.

Examples of monomers indicated by the preceding formula (IV) include tetracyclododecenes for which m is 1 and hexacycloheptadecenes for which m is 2.

Examples of tetracyclododecenes (m=1) include tetracyclododecene; tetracyclododecenes that include an alkyl group such as 8-methyltetracyclododecene, 8-ethyltetracyclododecene, 8-cyclohexyltetracyclododecene, and 8-cyclopentyltetracyclododecene; tetracyclododecenes that include a double bond outside of a ring such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene; tetracyclododecenes that include an aromatic ring such as 8-phenyltetracyclododecene; tetracyclododecenes that include a substituent including an oxygen atom such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic acid anhydride; tetracyclododecenes that include a substituent including a nitrogen atom such as 8-cyanotetracyclododecene and tetracyclododecene-8,9-dicarboxylic acid imide; tetracyclododecenes that include a substituent including a halogen atom such as 8-chlorotetracyclododecene; and tetracyclododecenes that include a substituent including a silicon atom such as 8-trimethoxysilyltetracyclododecene. One of these tetracyclododecenes may be used individually, or two or more of these tetracyclododecenes may be used in combination.

Examples of hexacycloheptadecenes (m=2) include hexacycloheptadecene; hexacycloheptadecenes that include an alkyl group such as 12-methylhexacycloheptadecene, 12-ethylhexacycloheptadecene, 12-cyclohexylhexacycloheptadecene, and 12-cyclopentylhexacycloheptadecene; hexacycloheptadecenes that include a double bond outside of a ring such as 12-methylidenehexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene; hexacycloheptadecenes that include an aromatic ring such as 12-phenylhexacycloheptadecene; hexacycloheptadecenes that include a substituent including an oxygen atom such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-dicarboxylic acid, and hexacycloheptadecene-12,13-dicarboxylic acid anhydride; hexacycloheptadecenes that include a substituent including a nitrogen atom such as 12-cyanohexacycloheptadecene and hexacycloheptadecene- 12,13-dicarboxylic acid imide; hexacycloheptadecenes that include a substituent including a halogen atom such as 12-chlorohexacycloheptadecene; and hexacycloheptadecenes that include a substituent including a silicon atom such as 12-trimethoxysilylhexacycloheptadecene.

Of these examples, 5-ethylidenenorbornene and dicyclopentadiene are preferable. In other words, in a case in which the presently disclosed hydrogenated ring-opened polymer includes structural units derived from one or more other monomers, the structural units derived from other monomers are preferably 5-ethylidenenorbornene-derived structural units and/or dicyclopentadiene-derived structural units.

<Proportion of Meso Diads>

In the presently disclosed hydrogenated ring-opened polymer, the proportion of meso diads of cis-structural units (I) included among norbornene-derived structural units is required to be not less than 0% and not more than 30% or be not less than 70% and not more than 100%. In other words, the proportion of meso diads of cis-structural units (I) included among norbornene-derived structural units in the presently disclosed hydrogenated ring-opened polymer is required to not be within a range of more than 30% and less than 70% (i.e., be outside of a range of more than 30% and less than 70%). When the proportion of meso diads of cis-structural units (I) is more than 30% and less than 70%, the stereoregularity of molecular chain sections formed of cis-structural units (I) in the hydrogenated ring-opened polymer decreases (i.e., the structure of molecular chain sections formed of cis-structural units (I) becomes an atactic structure). This reduction of stereoregularity is presumed to contribute to reducing ductility of the hydrogenated ring-opened polymer when the proportion of meso diads of cis-structural units (I) is more than 30% and less than 70%. In contrast, the presently disclosed hydrogenated ring-opened polymer can have excellent ductility as a result of the proportion of meso diads of cis-structural units (I) being not less than 0% and not more than 30% (i.e., molecular chain sections formed of cis-structural units (I) having a syndiotactic structure) or being not less than 70% and not more than 100% (i.e., molecular chain sections formed of cis-structural units (I) having an isotactic structure).

In a case in which the proportion of meso diads of cis-structural units (I) is within a range of not less than 0% and not more than 30%, this proportion can be set as 10% or more, for example, and can be set as 25% or less, for example.

Moreover, in a case in which the proportion of meso diads of cis-structural units (I) is within a range of not less than 70% and not more than 100%, this proportion can be set as 75% or more, for example, and can be set as 90% or less, for example.

Note that the proportion of meso diads of cis-structural units (I) in the hydrogenated ring-opened polymer can be adjusted by altering the production method of the hydrogenated ring-opened polymer. For example, the aforementioned proportion can be adjusted by altering the type of ring-opening polymerization catalyst used in production of a ring-opened polymer that is a precursor of the hydrogenated ring-opened polymer.

<Isomerization Rate>

The proportion constituted by trans-structural units (II) among the total of cis-structural units (I) and trans-structural units (II) in the presently disclosed hydrogenated ring-opened polymer (i.e., the isomerization rate) is required to be not less than 0.5% and not more than 20%, is preferably 1% or more, and is preferably 15% or less. When the isomerization rate is outside of the ranges set forth above, ductility of the hydrogenated ring-opened polymer decreases.

Note that the isomerization rate of the hydrogenated ring-opened polymer can be adjusted by altering the production method of the hydrogenated ring-opened polymer. For example, the isomerization rate can be adjusted by altering the type and/or amount of a hydrogenation catalyst that is used to hydrogenate a ring-opened polymer that is a precursor through a hydrogenation reaction.

<Weight-Average Molecular Weight>

The weight-average molecular weight of the presently disclosed hydrogenated ring-opened polymer is preferably 10,000 or more, more preferably 15,000 or more, even more preferably 20,000 or more, further preferably 25,000 or more, and particularly preferably 35,000 or more, and is preferably 1,000,000 or less, more preferably 500,000 or less, even more preferably 300,000 or less, further preferably 200,000 or less, and particularly preferably 150,000 or less. Ductility of the hydrogenated ring-opened polymer can be further improved when the weight-average molecular weight is 10,000 or more, whereas processability of the hydrogenated ring-opened polymer can be sufficiently ensured when the weight-average molecular weight is 1,000,000 or less.

Note that the weight-average molecular weight of the hydrogenated ring-opened polymer can be adjusted by altering the production method of the hydrogenated ring-opened polymer. For example, the weight-average molecular weight can be adjusted by altering the type and/or amount of a ring-opening polymerization catalyst, a molecular weight modifier, or the like used in production of a ring-opened polymer that is a precursor of the hydrogenated ring-opened polymer.

<Crystallinity and Melting Point>

The presently disclosed hydrogenated ring-opened polymer is preferably crystalline. When a polymer is referred to as "crystalline", this means that a melting point can be observed by differential scanning calorimetry (DSC) through optimization of measurement conditions, etc., and is an attribute that is determined by the stereoregularity of polymer chains.

The melting point of the presently disclosed hydrogenated ring-opened polymer is preferably 110° C. or higher, more preferably 120° C. or higher, and even more preferably 130° C. or higher, and is preferably 200° C. or lower, more preferably 190° C. or lower, and even more preferably 180° C. or lower. Heat resistance of the hydrogenated ring-opened polymer can be ensured when the melting point is 110° C. or higher, whereas heat sealing properties of the hydrogenated ring-opened polymer can be ensured when the melting point is 200° C. or lower.

Note that the melting point of the hydrogenated ring-opened polymer can be adjusted by altering the production method of the hydrogenated ring-opened polymer. For example, the melting point can be adjusted by altering the type and/or amount of a ring-opening polymerization catalyst, a molecular weight modifier, or the like used in production of a ring-opened polymer that is a precursor of the hydrogenated ring-opened polymer.

Moreover, the "melting point" can be measured by a differential scanning calorimeter and can, for example, be measured using a method described in the EXAMPLES section of the present specification.

<Nickel Content>

The content of nickel (nickel content) in the presently disclosed hydrogenated ring-opened polymer as measured by inductively coupled plasma atomic emission spectroscopy may, for example, be not less than 0.5 mass ppb and not more than 50 mass ppm.

Note that nickel contained in the hydrogenated ring-opened polymer may originate from a hydrogenation catalyst used for hydrogenation, for example. The amount of nickel contained in the hydrogenated ring-opened polymer can be reduced by performing filtration after the hydrogenation reaction, for example.

<Percentage Hydrogenation>

The percentage hydrogenation of the presently disclosed hydrogenated ring-opened polymer (i.e., the proportion of carbon-carbon double bonds that are hydrogenated among those included in a ring-opened polymer that is a precursor) is normally 90% or more, preferably 95% or more, and more preferably 99% or more.

Note that the percentage hydrogenation of a hydrogenated ring-opened polymer can be identified by $^1$H-NMR measurement.

Moreover, the percentage hydrogenation of the hydrogenated ring-opened polymer can be adjusted by altering conditions of the hydrogenation reaction, for example.

<Production Method of Hydrogenated Ring-Opened Polymer>

The presently disclosed hydrogenated ring-opened polymer can be produced by performing ring-opening polymerization of a monomer composition that contains norbornene and then subjecting the resultant ring-opened polymer to a hydrogenation reaction. After treatment may be performed as necessary after the hydrogenation reaction.

<<Ring-Opening Polymerization>>

The ring-opening polymerization of the monomer composition containing norbornene can be performed using a ring-opening polymerization catalyst. Note that a polymerization aid such as a molecular weight modifier may be added into the polymerization system during ring-opening polymerization. Moreover, the ring-opening polymerization may be performed without a solvent or in the presence of a solvent.

[Ring-Opening Polymerization Catalyst]

Although no specific limitations are placed on the ring-opening polymerization catalyst so long as ring-opening polymerization of the monomer composition containing norbornene can be performed and a ring-opened polymer that can be used as a precursor for the hydrogenated ring-opened polymer having specific properties can be obtained, it is preferable that the ring-opening polymerization catalyst used in production of the ring-opened polymer is a ring-opening polymerization catalyst that can impart stereoregularity to a ring-opened polymer from a viewpoint of efficiently obtaining a hydrogenated ring-opened polymer for which the proportion of meso diads is within a specific range. Examples of ring-opening polymerization catalysts that can impart stereoregularity to a ring-opened polymer in this manner include complex catalysts that include a transition metal belonging to group 6 of the periodic table (for example, complex catalysts described in JP2007-137935A, JP2002-249553A, WO2015/127192A1, and Macromolecules, 2015, 48 (8), pp 2480-2492).

—Complex Catalyst Including Transition Metal Belonging to Group 6 of Periodic Table—

The transition metal belonging to group 6 of the periodic table that is included (as a central atom) in the complex catalyst can be chromium, tungsten, or molybdenum, and is preferably tungsten or molybdenum.

More specifically, examples of the complex catalyst including a transition metal belonging to group 6 of the periodic table include tungsten(ethylimide)(tetrachloride)(diethyl ether), tungsten(ethylimide) (t-butoxide)(trichloride), tungsten(ethylimide)[di(t-butoxide)](dichloride), tungsten(ethylimide)[tri(t-butoxide)](chloride), tungsten (ethylimide)[tetra(t-butoxide)], tungsten(ethylimide)(phenoxide)(tetrachloride)(diethyl ether), tungsten(n-butylimide)(tetrachloride)(tetrahydrofuran), tungsten(n-hexylimide)(tetrachloride)(diethyl ether), tungsten(i-propylimide)(tetrachloride)(diethyl ether), tungsten(cyclohexylimide)(tetrachloride)(diethyl ether), tungsten(adamantylimide)(tetrachloride)(diethyl ether), tungsten(benzylimide)(tetrachloride)(diethyl ether), tungsten(phenylimide)(tetrachloride)(diethyl ether), tungsten(phenylimide)(tetrachloride)(tetrahydrofuran), tungsten(2,6-dimethylphenylimide)(tetrachloride)(diethyl ether), and tungsten[2,6-di(i-propyl)(phenylimide)](tetrachloride)(diethyl ether).

Further examples of the complex catalyst including a transition metal belonging to group 6 of the periodic table include bis{3,3'-di(t-butyl)-5,5',6,6'-tetramethyl-2,2'-biphenoxy}oxymolybdenum(VI), bis{3,3',5,5'-tetramethyl-2,2'-biphenoxy}oxymolybdenum(VI), {3,3'-di(t-butyl)-5,5',6,6'-tetramethyl-2,2'-biphenoxy}oxymolybdenum(VI) dichloride, bis{3,3'-diphenyl-1,1'-binaphthyl-2,2'-dioxy}oxymolybdenum(VI), {3,3'-diphenyl-1,1'-binaphthyl-2,2'-dioxy}oxymolybdenum(VI) dichloride, bis{3,3'-di(t-butyl)-5,5',6,6'-tetramethyl-2,2'-biphenoxy}oxytungsten(VI), {3,3'-di(t-butyl)-5,5',6,6'-tetramethyl-2,2'- biphenoxy} oxytungsten(VI) dichloride, bis{3,3'-diphenyl-1,1'-binaphthyl-2,2'-dioxy}oxytungsten(VI), {3,3'-diphenyl-1,1'-binaphthyl-2,2'-dioxy}oxytungsten(VI) dichloride, bis{3,3'-di(t-butyl)-5,5',6,6'-tetramethyl-2,2'-biphenoxy}tungsten(VI) dichloride, {3,3'-di(t-butyl)-5,5',6,6'-tetramethyl-2,2'-biphenoxy}tungsten(VI) tetrachloride, bis{3,3'-diphenyl-1,1'-binaphthyl-2,2'-dioxy}tungsten(VI) dichloride, and {3,3'-diphenyl-1,1'-binaphthyl-2,2'-dioxy}tungsten(VI) tetrachloride.

Another example of the complex catalyst including a transition metal belonging to group 6 of the periodic table is a complex catalyst indicated by the following formula (V).

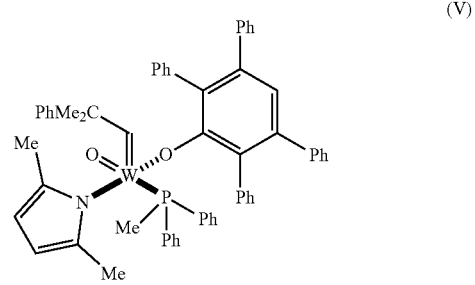

(V)

One complex catalyst including a transition metal belonging to group 6 of the periodic table may be used individually, or two or more of such complex catalysts may be used in combination. The complex catalyst including a transition metal belonging to group 6 of the periodic table is particularly preferably tungsten(phenylimide)(tetrachloride)(diethyl ether), tungsten(phenylimide)(tetrachloride)(tetrahydrofuran), tungsten[2,6-di(i-propyl)(phenylimide)](tetrachloride)(diethyl ether), bis{3,3'-di(t-butyl)-5,5',6,6'-tetramethyl-2,2'-biphenoxy}oxymolybdenum(VI), bis{3,3', 5,5'-tetramethyl-2,2'-biphenoxy}oxymolybdenum(VI), or the complex catalyst indicated by formula (V).

—Co-Catalyst—

In order to increase catalytic activity, it is preferable to use a complex catalyst including a transition metal belonging to group 6 of the periodic table such as described above and a co-catalyst other than the complex catalyst in combination as the ring-opening polymerization catalyst.

The co-catalyst may be a known organometallic compound. The organometallic compound is preferably an organometallic compound of any one of groups 1, 2, 12, 13, and 14 of the periodic table that includes a hydrocarbon group having a carbon number of not less than 1 and not more than 20, is more preferably an organolithium compound, an organomagnesium compound, an organozinc compound, an organoaluminum compound, or an organotin compound, and is particularly preferably an organolithium compound or an organoaluminum compound.

Examples of organolithium compounds include n-butyllithium, methyllithium, phenyllithium, neopentyllithium, and neophyllithium.

Examples of organomagnesium compounds include butylethylmagnesium, butyloctylmagnesium, dihexylmagnesium, ethylmagnesium chloride, n-butylmagnesium chloride, allylmagnesium bromide, neopentylmagnesium chloride, and neophylmagnesium chloride.

Examples of organozinc compounds include dimethylzinc, diethylzinc, and diphenylzinc.

Examples of organoaluminum compounds include trimethylaluminum, triethylaluminum, triisobutylaluminum, diethylaluminum chloride, diethylaluminum ethoxide, ethylaluminum dichloride, and ethylaluminum diethoxide.

Examples of organotin compounds include tetramethyltin, tetra(n-butyl)tin, and tetraphenyltin.

Note that one co-catalyst may be used individually, or two or more co-catalysts may be used in combination.

[Molecular Weight Modifier]

The molecular weight modifier that can optionally be used in ring-opening polymerization may be a vinyl compound or a diene compound, for example.

The vinyl compound can be any organic compound that includes a vinyl group and does not correspond to the subsequently described diene compound without any specific limitations. Examples include α-olefins such as 1-butene, 1-pentene, 1-hexene, and 1-octene; styrenes such as styrene and vinyltoluene; ethers such as ethyl vinyl ether, i-butyl vinyl ether, and allyl glycidyl ether; halogen-containing vinyl compounds such as allyl chloride; oxygen-containing vinyl compounds such as allyl acetate, allyl alcohol, and glycidyl methacrylate; nitrogen-containing vinyl compounds such as acrylamide; and silicon-containing vinyl compounds such as vinyltrimethylsilane and vinyltrimethoxysilane.

Examples of the diene compound include non-conjugated dienes such as 1,4-pentadiene, 1,4-hexadiene, 1,5-hexadiene, 1,6-heptadiene, 2-methyl-1,4-pentadiene, and 2,5-dimethyl-1,5-hexadiene; and conjugated dienes such as 1,3-butadiene, 2-methyl-1,3-butadiene, 2,3-dimethyl-1,3-butadiene, 1,3-pentadiene, and 1,3-hexadiene.

One molecular weight modifier may be used individually, or two or more molecular weight modifiers may be used in combination. The molecular weight modifier is preferably an α-olefin, and is more preferably 1-octene.

[Solvent]

The ring-opening polymerization is preferably carried out in a solvent from a viewpoint of enabling good control of the reaction, and, in particular, is preferably carried out in an organic solvent.

No specific limitations are placed on the organic solvent that is used so long as the obtained ring-opened polymer can be dissolved or dispersed in the organic solvent and so long as the organic solvent is inert in the polymerization reaction. Specific examples include aliphatic hydrocarbon solvents such as pentane, hexane, and heptane; alicyclic hydrocarbon solvents such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene cyclohexane, and cyclooctane; aromatic hydrocarbon solvents such as benzene, toluene, and xylene; halogenated aliphatic hydrocarbon solvents such as dichloromethane, chloroform, and 1,2-dichloroethane; halogenated aromatic hydrocarbon solvents such as chlorobenzene and dichlorobenzene; nitrogen-containing hydrocarbon solvents such as nitromethane, nitrobenzene, and acetonitrile; ether solvents such as diethyl ether and tetrahydrofuran; and aromatic ether solvents such as anisole and phenetole. One solvent may be used individually, or two or more solvents may be used in combination. Aromatic hydrocarbon solvents, aliphatic hydrocarbon solvents, alicyclic hydrocarbon solvents, ether solvents, and aromatic ether solvents are particularly preferable as the solvent.

[Conditions of Ring-Opening Polymerization]

The conditions of ring-opening polymerization (used amounts of components described above, polymerization time, polymerization temperature, etc.) can be set as appropriate depending on the desired physical properties of the ring-opened polymer and the hydrogenated ring-opened polymer without any specific limitations.

<<Hydrogenation Reaction>>

The hydrogenated ring-opened polymer can be obtained by performing a hydrogenation reaction of the ring-opened polymer obtained through the ring-opening polymerization described above. The hydrogenation reaction can be carried out by, for example, in the presence of a hydrogenation catalyst, supplying hydrogen gas into a polymer solution (or polymer dispersion liquid) containing a solvent and the ring-opened polymer obtained after the ring-opening polymerization described above.

Note that the solvent used in the hydrogenation reaction is not specifically limited, and a solvent (particularly an organic solvent) that was used in the ring-opening polymerization described above can be used as the solvent, for example.

[Hydrogenation Catalyst]

The hydrogenation catalyst can be any hydrogenation catalyst that is typically used in a hydrogenation reaction of an olefin compound without any specific limitations. Examples include Ziegler catalysts that are a combination of a transition metal compound and an alkali metal compound such as a combination of cobalt acetate and triethylaluminum, a combination of nickel acetylacetonate and triisobutylaluminum, a combination of titanocene dichloride and n-butyllithium, a combination of zirconocene dichloride and sec-butyllithium, or a combination of tetrabutoxytitanate and dimethylmagnesium; precious metal complex catalysts formed of dichlorotris(triphenylphosphine)rhodium or a ruthenium compound described in JP-H7-2929A, JP-H7-149823A, JP-H11-209460A, JP-H11-158256A, JP-H11-193323A, JP-H11-209460A, or the like; other such homogeneous catalysts; and supported heterogeneous catalysts in which a metal such as nickel, palladium, platinum, rhodium, or ruthenium is supported on a support such as carbon, silica, diatomaceous earth, alumina, or titanium oxide.

One hydrogenation catalyst may be used individually, or two or more hydrogenation catalysts may be used in combination. A supported heterogeneous catalyst is preferably used as the hydrogenation catalyst because this makes it possible to easily remove the hydrogenation catalyst from the reaction solution by filtration after the hydrogenation reaction.

The supported heterogeneous catalyst is, more specifically, preferably a combination such as nickel/silica, nickel/diatomaceous earth, nickel/alumina, palladium/carbon, palladium/silica, palladium/diatomaceous earth, or palladium/alumina.

[Conditions of Hydrogenation Reaction]

The conditions of the hydrogenation reaction (used amount of hydrogenation catalyst, reaction time, reaction temperature, hydrogen pressure, etc.) can be set as appropriate depending on the desired physical properties (for example, percentage hydrogenation and isomerization rate) of the hydrogenated ring-opened polymer without any specific limitations.

<After Treatment>

After the ring-opening polymerization and the hydrogenation reaction described above, after treatment may be performed as necessary to enable good isolation of the target hydrogenated ring-opened polymer. For example, in a case in which a heterogeneous catalyst is used, filtration may be performed in the hydrogenation reaction to remove the hydrogenation catalyst, and then the hydrogenated ring-opened polymer may be obtained by coagulation drying or by direct drying using a thin-film dryer or the like. Moreover, in a case in which a homogeneous catalyst is used as the hydrogenation catalyst, an alcohol or water may be added after the hydrogenation reaction so as to deactivate the catalyst and insolubilize the catalyst in the solvent, and then the catalyst may be removed by filtration. The hydrogenated ring-opened polymer can normally be obtained in a powder or pellet form.

(Resin Composition)

The presently disclosed resin composition contains the presently disclosed hydrogenated ring-opened polymer set forth above and can optionally contain known additives. As a result of containing the presently disclosed hydrogenated ring-opened polymer, the presently disclosed resin composition can advantageously be used as a material of a shaped product having excellent ductility.

Examples of known additives that can be used include, but are not specifically limited to, polymers (thermoplastic elastomers, etc.) other than the presently disclosed hydrogenated ring-opened polymer, fillers, antioxidants, mold release agents, flame retardants, antibacterial agents, wood flour, coupling agents, plasticizers, colorants, lubricants, silicon oil, foaming agents, surfactants, light stabilizers, lubricants and dispersion aids, heat stabilizers, ultraviolet absorbers, antistatic agents, dispersants, chlorine scavengers, crystallization nucleating agents, antifogging agents, organic fillers, neutralizers, decomposers, metal deactivators, and antifouling agents. One of these additives may be used individually, or two or more of these additives may be used in combination.

No specific limitations are placed on the method by which the resin composition is produced. For example, a method in which the hydrogenated ring-opened polymer and additives that are added as necessary are kneaded to obtain a resin composition in a pellet form or a method in which the hydrogenated ring-opened polymer and additives that are added as necessary are mixed in an appropriate solvent and then the solvent is removed to obtain a resin composition may be adopted.

The kneading can be performed using a melt-kneading machine such as a single-screw extruder, a twin-screw extruder, a Banbury mixer, a kneader, or a Feeder Ruder. The kneading temperature is preferably within a range of 200° C. to 400° C., and more preferably within a range of 240° C. to 350° C. In the kneading, all of the components may be added at once and then kneaded, or kneading may be performed while adding the components over multiple additions.

(Shaped Product)

The presently disclosed shaped product is formed using the presently disclosed resin composition set forth above. The presently disclosed shaped product has excellent ductility as a result of being obtained through shaping of the presently disclosed resin composition.

No specific limitations are placed on the method by which the shaped product is produced. For example, the resin composition can be converted to the shaped product using a known shaping means such as injection molding, compression molding, or extrusion molding. The shape of the shaped product can be selected as appropriate depending on the application.

Note that the application of the presently disclosed shaped product is not specifically limited and examples thereof include:

optical materials such as optical discs, optical lenses, prisms, light diffusers, optical cards, optical fibers, optical mirrors, liquid crystal display element substrates, light guides, polarizing films, and retardation films;

medical tools and materials such as containers for liquid, powder, and solid pharmaceuticals (containers for liquid pharmaceuticals for injections, ampoules, vials, pre-filled syringes, infusion bags, inner layers, intermediate layers, and outer layers of multilayer films, sealant films, hermetically sealed pharmaceutical bags, press-through packages, containers for solid pharmaceuticals, containers for eye drops, etc.), sampling containers (sampling test tubes for blood tests, caps for pharmaceutical containers, blood collection tubes, specimen containers, etc.), medical tools (syringes, etc.), sterilization containers for medical tools and the like (for scalpels, forceps, gauze, contact lenses, etc.), experimental/analysis tools (beakers, petri dishes, flasks, test tubes, centrifuge tubes, etc.), medical optical components (plastic lenses for medical tests, etc.), pipe materials (medical infusion tubes, pipes, joints, valves, etc.), and artificial organs and components thereof (dental plates, artificial hearts, artificial dental roots, etc.);

food containers such as bottles, returnable bottles, baby bottles, films, and shrink films;

electronic component processing tools and materials such as containers for processing or transfer (tanks, trays, carriers, cases, etc.), protective materials (carrier tapes, separation films, etc.), piping (pipes, tubes, values, flow rate meters, filters, pumps, etc.), and liquid containers (sampling containers, bottles, ampoule bags, etc.);

electrically insulating materials such as coating materials (for electrical wires, cables, etc.), housings of electronic devices for consumers or industry (copiers, computers, printers, televisions, video decks, video cameras, etc.), and structural members (parabolic antenna structural members, flat antenna structural members, radar dome structural members, etc.);

circuit boards such as general circuit boards (rigid printed boards, flexible printed boards, multilayer printed wiring boards, etc.) and high frequency circuit boards (circuit boards for satellite communication devices, etc.); substrates of transparent conductive films (liquid crystal substrates, optical memory, sheet heating elements, etc.);

sealing materials such as semiconductor sealing materials (transistor sealing materials, IC sealing materials, LSI sealing materials, LED sealing materials, etc.) and sealing materials for electrical and electronic components (motor sealing materials, capacitor sealing materials, switch sealing materials, sensor sealing materials, etc.);

interior materials for automobiles such as covers of meters and rear-view mirrors; and exterior materials for automobiles such as side-view mirrors, fender mirrors, beam lenses, and light covers.

EXAMPLES

The following provides a more specific description of the present disclosure through examples. However, the present disclosure is not limited to these examples. In the following description, "%" and "parts" used in expressing quantities are by mass, unless otherwise specified.

In the examples and comparative examples, the following methods were used to measure and evaluate the copolymerization composition ratio of a ring-opened polymer, the percentage hydrogenation, weight-average molecular weight, melting point, proportion of meso diads of cis-structural units (I), isomerization rate, and nickel content of a hydrogenated ring-opened polymer, and the elongation at break (ductility) of a shaped product.

<Copolymerization Composition Ratio>

Based on $^1$H-NMR measurement of a ring-opened polymer, a ratio of the number of hydrogen atoms originating from norbornene units and the number of hydrogen atoms originating from other monomer units was determined, and then the copolymerization composition ratio of the ring-opened polymer was calculated based on this ratio.

Note that the ring-opened polymer used in measurement was sampled by pouring a large amount of acetone into a polymerization reaction liquid containing the ring-opened polymer to obtain aggregated material, filtering off the aggregated material, and then washing the resultant filtration residue with methanol and subsequently performing vacuum drying at 40° C. for 24 hours.

<Percentage Hydrogenation>

The percentage hydrogenation was calculated based on $^1$H-NMR measurement.

<Weight-Average Molecular Weight>

The weight-average molecular weight of a hydrogenated ring-opened polymer was measured as a standard polystyrene-equivalent value by gel permeation chromatography (GPC) using 1,2,4-trichlorobenzene as an eluent. An HLC8121GPC/HT (produced by Tosoh Corporation) was used as a measurement apparatus.

A sample was prepared by dissolving material for measurement in 1,2,4-trichlorobenzene under heating at 140° C. such that the sample concentration was 1 mg/mL.

Measurement was performed under conditions of a flow rate of 1.0 mL/min, a sample injection volume of 300 µL, and a column temperature of 140° C. using three TSKgel GMHHR H(20)HT columns (produced by Tosoh Corporation) connected in series as a column.

<Melting Point>

The melting point of a hydrogenated ring-opened polymer was, regardless of the presence or absence of resin thermal hysteresis, determined by using a differential scanning calorimeter (DSC; X-DSC7000 produced by SII NanoTechnology) to perform measurement through heating at a rate of 10° C./min, and taking the temperature point corresponding to a largest endothermic energy amount at a first-order phase transition peak of crystal melting to be the melting point.

<Proportion of Meso Diads of Cis-Structural Units (I)>

The proportion of meso diads of cis-structural units (I) in a hydrogenated ring-opened polymer was calculated by $^{13}$C-NMR measurement (solvent: deuterated chloroform; measurement temperature: 60° C.). Specifically, the proportion (percentage) of meso diads was calculated by dividing the signal intensity for meso diads observed at 31.712 ppm in the obtained NMR spectrum by the total of the signal intensity for racemo diads observed at 31.724 ppm and the signal intensity for meso diads observed at 31.712 ppm in the obtained NMR spectrum, and then multiplying the resultant value by 100.

Note that in a case in which the hydrogenated ring-opened polymer had low solubility in a solvent and it was necessary to dissolve the hydrogenated ring-opened polymer at a high temperature, calculation was performed through $^{13}$C-NMR performed with deuterated tetrachloroethane as a solvent and a measurement temperature of 125° C. In such a case, the proportion (percentage) of meso diads was, more specifically, calculated by dividing the signal intensity for meso diads observed at 40.315 ppm in the obtained NMR spectrum by the total of the signal intensity for racemo diads observed at 40.310 ppm and the signal intensity for meso diads observed at 40.315 ppm in the obtained NMR spectrum, and then multiplying the resultant value by 100.

Note that the chemical shift of each signal in $^{13}$C-NMR varies slightly depending on the measurement environment and the analysis process.

<Isomerization Rate>

The isomerization rate of a hydrogenated ring-opened polymer was calculated by $^{13}$C-NMR measurement (solvent: deuterated chloroform; measurement temperature: 60° C.). Specifically, the isomerization rate (percentage) was calculated by dividing the signal intensity for trans-structural units (II) observed at 32.96 ppm to 33.01 ppm in the obtained NMR spectrum by the total of the signal intensity for cis-structural units (I) observed at 31.70 ppm to 31.73 ppm and the signal intensity for trans-structural units (II) observed at 32.96 ppm to 33.01 ppm in the obtained NMR spectrum, and then multiplying the resultant value by 100.

Note that in a case in which the hydrogenated ring-opened polymer had low solubility in a solvent and it was necessary to dissolve the hydrogenated ring-opened polymer at a high temperature, calculation was performed through $^{13}$C-NMR performed with deuterated tetrachloroethane as a solvent and a measurement temperature of 125° C. In such a case, the isomerization rate (percentage) was, more specifically, calculated by dividing the signal intensity for trans-structural units (II) observed at 32.72 ppm in the obtained NMR spectrum by the total of the signal intensity for cis-structural units (I) observed at 31.66 ppm and the signal intensity for trans-structural units (II) observed at 32.72 ppm in the obtained NMR spectrum, and then multiplying the resultant value by 100.

Note that the chemical shift of each signal in $^{13}$C-NMR varies slightly depending on the measurement environment and the analysis process.

<Nickel Content>

The amount of nickel contained in a hydrogenated ring-opened polymer was measured by inductively coupled plasma atomic emission spectroscopy (ICP-AES) by the following procedure.

A test specimen of approximately 7 mm×20 mm that was formed from approximately 0.45 g of the hydrogenated ring-opened polymer was weighed into a volumetric flask A. A volumetric flask B for a blank test was also separately prepared. The test specimen in the volumetric flask A was wet decomposed using sulfuric acid and nitric acid, was left to cool, and the volume of the volumetric flask A was adjusted to 10 L with ultrapure water. The obtained sample was appropriately diluted and was then analyzed under the following measurement conditions using an ICP atomic emission spectrophotometer. Note that the same amounts of sulfuric acid and nitric acid were also loaded into the volumetric flask B for the blank test, and the volume of the volumetric flask B was adjusted to 10 L with ultrapure water.

Calibration curve: Internal standard calibration curve method

Measurement wavelength: 231.604 nm (nickel)

<Elongation at Break (Ductility)>

The elongation at break was measured based on JIS K 7127 as outlined below.

First, a hydrogenated ring-opened polymer was shaped into a film shape having a thickness of approximately 100 μm by vacuum pressurized hot pressing. The obtained shaped product was punched to produce a test specimen (type 5).

The obtained test specimen was then subjected to a tensile test until breaking using a TENSILON Universal Testing Machine (produced by ORIENTIC; product name: RTC-1125A) under conditions of 23° C., a tensing rate of 50 mm/min, and a chuck spacing of 50 mm. The elongation when breaking occurred was taken to be the elongation at break (%).

Example 1

A glass reactor A equipped with a stirrer was charged with 0.028 g of phenylimidotungsten(VI) tetrachloride tetrahydrofuran (also referred to as "tungsten(phenylimide)(tetrachloride)(tetrahydrofuran)") and 5 mL of toluene, and these materials were stirred. Next, 27 g of cyclohexane, 0.22 g of 1-octene (2.5 mol % per 100 mol % of norbornene), and a solution obtained by dissolving 0.022 g of diethylaluminum ethoxide in 1 mL of n-hexane were added into a separate glass reactor B equipped with a stirrer. Next, the toluene solution of phenylimidotungsten(VI) tetrachloride tetrahydrofuran in the glass reactor A and 7.5 g of norbornene were added into the glass reactor B over 2 hours, and a polymerization reaction was carried out at 50° C. for 2 hours to yield a polymerization reaction liquid containing a ring-opened polymer. Note that the viscosity of the reaction mixture gradually increased after the start of the polymerization reaction.

The polymerization reaction liquid obtained as described above was transferred to an autoclave equipped with a stirrer without allowing precipitation, 0.075 g of a diatomaceous earth-supported nickel catalyst (T8400 produced by Nissan Sud-Chemie; nickel support rate: 58 weight %) was added thereto, and a reaction was carried out at 200° C. and a hydrogen pressure of 4.5 MPa for 8 hours. The solution was then filtered by a filtration device equipped with a stainless steel mesh using separately added diatomaceous earth as a filtration aid, and the resultant reaction solution was dried in a vacuum dryer set to $0.13×10^3$ Pa or lower and 100° C. for 48 hours to yield 7.5 g of a hydrogenated ring-opened polymer. Various measurements and evaluations were performed with respect to the hydrogenated ring-opened polymer that was obtained. The results are shown in Table 1.

Example 2

A glass reactor A equipped with a stirrer was charged with 0.028 g of phenylimidotungsten(VI) tetrachloride tetrahydrofuran and 5 mL of toluene, and these materials were stirred. Next, 27 g of cyclohexane, 0.18 g of 1-octene (2.0 mol % per 100 mol % of norbornene), and a solution obtained by dissolving 0.022 g of diethylaluminum ethoxide in 1 mL of n-hexane were added into a separate glass reactor B equipped with a stirrer. Next, the toluene solution of phenylimidotungsten(VI) tetrachloride tetrahydrofuran in the glass reactor A and 7.5 g of norbornene were added into the glass reactor B over 2 hours, and a polymerization reaction was carried out at 50° C. for 2 hours to yield a polymerization reaction liquid containing a ring-opened polymer. Note that the viscosity of the reaction mixture gradually increased after the start of the polymerization reaction.

The polymerization reaction liquid obtained as described above was transferred to an autoclave equipped with a stirrer without allowing precipitation, 0.15 g of a diatomaceous earth-supported nickel catalyst (T8400 produced by Nissan Sud-Chemie; nickel support rate: 58 weight %) was added thereto, and a reaction was carried out at 200° C. and a hydrogen pressure of 4.5 MPa for 8 hours. The solution was then filtered by a filtration device equipped with a stainless steel mesh using separately added diatomaceous earth as a filtration aid, and the resultant reaction solution was dried in a vacuum dryer set to $0.13×10^3$ Pa or lower and 100° C. for 48 hours to yield 7.5 g of a hydrogenated ring-opened polymer. Various measurements and evaluations were performed with respect to the hydrogenated ring-opened polymer that was obtained. The results are shown in Table 1.

Example 3

A ring-opened polymer was obtained (yield: 7.4 g) in the same way as in Example 1 with the exception that the amount of 1-octene was changed to 0.135 g (1.5 mol % per 100 mol % of norbornene). In addition, 7.5 g of a hydrogenated ring-opened polymer was obtained in the same way as in Example 2 with the exception that the aforementioned ring-opened polymer was used. Various measurements and evaluations were performed with respect to the hydrogenated ring-opened polymer that was obtained. The results are shown in Table 1.

Example 4

A ring-opened polymer and a hydrogenated ring-opened polymer were obtained in the same way as in Example 2 with the exception that the amount of the diatomaceous earth-supported nickel catalyst was changed to 0.30 g. Various measurements and evaluations were performed with respect to the hydrogenated ring-opened polymer that was obtained. The results are shown in Table 1.

Example 5

A glass reactor A equipped with a stirrer was charged with 0.028 g of phenylimidotungsten(VI) tetrachloride diethyl ether (also referred to as "tungsten(phenylimide)(tetrachloride)(diethyl ether)") and 5 mL of toluene, and these materials were stirred. Next, 27 g of cyclohexane, 0.22 g of 1-octene (2.5 mol % per 100 mol % of norbornene), and a solution obtained by dissolving 0.022 g of diethylaluminum ethoxide in 1 mL of n-hexane were added into a separate glass reactor B equipped with a stirrer. Next, the toluene solution of phenylimidotungsten(VI) tetrachloride diethyl ether in the glass reactor A and 7.5 g of norbornene were added into the glass reactor B over 2 hours, and a polymerization reaction was carried out at 50° C. for 2 hours to yield a polymerization reaction liquid containing a ring-opened polymer. Note that the viscosity of the reaction mixture gradually increased after the start of the polymerization reaction.

The polymerization reaction liquid obtained as described above was transferred to an autoclave equipped with a stirrer without allowing precipitation, 0.075 g of a diatomaceous earth-supported nickel catalyst (T8400 produced by Nissan Sud-Chemie; nickel support rate: 58 weight %) was added thereto, and a reaction was carried out at 200° C. and a hydrogen pressure of 4.5 MPa for 8 hours. The solution was then filtered by a filtration device equipped with a stainless steel mesh using separately added diatomaceous earth as a filtration aid, and the resultant reaction solution was dried in a vacuum dryer set to $0.13 \times 10^3$ Pa or lower and 100° C. for 48 hours to yield 7.5 g of a hydrogenated ring-opened polymer. Various measurements and evaluations were performed with respect to the hydrogenated ring-opened polymer that was obtained. The results are shown in Table 1.

Example 6

A ring-opened polymer and a hydrogenated ring-opened polymer were obtained in the same way as in Example 1 with the exception that 7.425 g of norbornene and 0.075 g of ethylidenenorbornene (5-ethylidenenorbornene) were used instead of 7.5 g of norbornene. Note that the mass ratio of norbornene units and ethylidenenorbornene units in the obtained ring-opened polymer was 99:1. Various measurements and evaluations were performed with respect to the hydrogenated ring-opened polymer that was obtained. The results are shown in Table 1.

Example 7

A ring-opened polymer and a hydrogenated ring-opened polymer were obtained in the same way as in Example 1 with the exception that 7.425 g of norbornene and 0.075 g of dicyclopentadiene were used instead of 7.5 g of norbornene. Note that the mass ratio of norbornene units and dicyclopentadiene units in the obtained ring-opened polymer was 99:1. Various measurements and evaluations were performed with respect to the hydrogenated ring-opened polymer that was obtained. The results are shown in Table 1.

Example 8

A glass reactor A equipped with a stirrer was charged with 0.033 g of 2,6-diisopropylphenylimidotungsten(VI) tetrachloride diethyl ether (also referred to as "tungsten[2,6-di(i-propyl)(phenylimide)](tetrachloride)(diethyl ether)") and 5 mL of toluene, and these materials were stirred. Next, 27 g of cyclohexane, 0.22 g of 1-octene (2.5 mol % per 100 mol % of norbornene and dicyclopentadiene), and a solution obtained by dissolving 0.022 g of diethylaluminum ethoxide in 1 mL of n-hexane were added into a separate glass reactor B equipped with a stirrer. Next, the toluene solution of 2,6-diisopropylphenylimidotungsten(VI) tetrachloride diethyl ether in the glass reactor A, 7.425 g of norbornene, and 0.075 g of dicyclopentadiene were added into the glass reactor B over 2 hours, and a polymerization reaction was carried out at 50° C. for 2 hours to yield a polymerization reaction liquid containing a ring-opened polymer. Note that the viscosity of the reaction mixture gradually increased after the start of the polymerization reaction. The mass ratio of norbornene units and dicyclopentadiene units in the obtained ring-opened polymer was 99:1.

The polymerization reaction liquid obtained as described above was transferred to an autoclave equipped with a stirrer, 0.15 g of a diatomaceous earth-supported nickel catalyst (T8400 produced by Nissan Sud-Chemie; nickel support rate: 58 weight %) was added thereto, and a reaction was carried out at 200° C. and a hydrogen pressure of 4.5 MPa for 8 hours. The solution was then filtered by a filtration device equipped with a stainless steel mesh using separately added diatomaceous earth as a filtration aid, and the resultant reaction solution was dried in a vacuum dryer set to $0.13 \times 10^3$ Pa or lower and 100° C. for 48 hours to yield 7.5 g of a hydrogenated ring-opened polymer. Various measurements and evaluations were performed with respect to the hydrogenated ring-opened polymer that was obtained. The results are shown in Table 1.

Example 9

After loading 0.016 g of a complex catalyst indicated by formula (V), shown below, and 5 mL of toluene into a glass reactor equipped with a stirrer, 7.5 g of norbornene, 27 g of cyclohexane, and 0.88 g of 1-octene (10.0 mol % per 100 mol % of norbornene) were added, and a polymerization reaction was carried out at 50° C. to yield a polymerization reaction liquid containing a ring-opened polymer. Note that the viscosity of the reaction mixture gradually increased after the start of the polymerization reaction.

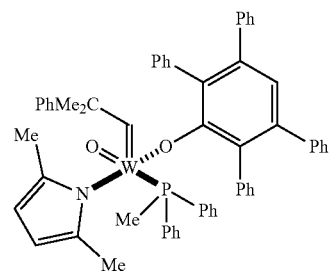

(V)

The polymerization reaction liquid obtained as described above was transferred to an autoclave equipped with a stirrer without allowing precipitation, 0.15 g of a diatomaceous earth-supported nickel catalyst (T8400 produced by Nissan Sud-Chemie; nickel support rate: 58 weight %) was added thereto, and a reaction was carried out at 200° C. and a hydrogen pressure of 4.5 MPa for 8 hours. The solution was then filtered by a filtration device equipped with a stainless steel mesh using diatomaceous earth as a filtration aid, and the resultant reaction solution was dried in a vacuum dryer set to $0.13 \times 10^3$ Pa or lower and 100° C. for 48 hours to yield 7.5 g of a hydrogenated ring-opened polymer. Various measurements and evaluations were performed with respect to the hydrogenated ring-opened polymer that was obtained. The results are shown in Table 1.

Example 10

A glass reactor equipped with a stirrer was charged with 0.0463 g of bis{3,3'-di(t-butyl)-5,5',6,6'-tetramethyl-2,2'-biphenoxy}oxymolybdenum(VI) and 4 mL of toluene, and these materials were cooled to −78° C. A solution obtained by dissolving 0.00726 g of n-butyllithium in 1 mL of hexane was added, the temperature was restored to room temperature, and a reaction was carried out for 15 minutes. Next, 10.0 g of norbornene, 27 g of cyclohexane, and 0.64 g of 1-hexene were added to the resultant reaction mixture, and a polymerization reaction was carried out at 50° C. to yield a polymerization reaction liquid containing a ring-opened polymer. Note that the viscosity of the mixture gradually increased after the start of the polymerization reaction.

Next, 7.4 g in terms of the ring-opened polymer of the polymerization reaction liquid obtained as described above was transferred to an autoclave equipped with a stirrer without allowing precipitation, 0.225 g of a diatomaceous earth-supported nickel catalyst (T8400 produced by Nissan Sud-Chemie; nickel support rate: 58 weight %) was added thereto, and a reaction was carried out at 200° C. and a hydrogen pressure of 4.5 MPa for 8 hours. The solution was then filtered by a filtration device equipped with a stainless steel mesh using separately added diatomaceous earth as a filtration aid, and the resultant reaction solution was dried in a vacuum dryer set to 0.13×10³ Pa or lower and 100° C. for 48 hours to yield 7.5 g of a hydrogenated ring-opened polymer. Various measurements and evaluations were performed with respect to the hydrogenated ring-opened polymer that was obtained. The results are shown in Table 2.

Example 11

A glass reactor equipped with a stirrer was charged with 0.0336 g of bis{3,3',5,5'-tetramethyl-2,2'-biphenoxy}oxymolybdenum(VI) and 4 mL of toluene, and these materials were cooled to −78° C. A solution obtained by dissolving 0.00726 g of n-butyllithium in 1 mL of hexane was added, the temperature was restored to room temperature, and a reaction was carried out for 15 minutes. Next, 7.425 g of norbornene, 0.075 g of dicyclopentadiene, 27 g of cyclohexane, and 0.64 g of 1-hexene were added to the resultant reaction mixture, and a polymerization reaction was carried out at 50° C. to yield a polymerization reaction liquid containing a ring-opened polymer. Note that the viscosity of the mixture gradually increased after the start of the polymerization reaction. The mass ratio of norbornene units and dicyclopentadiene units in the obtained ring-opened polymer was 99:1.

Next, 7.4 g in terms of the ring-opened polymer of the polymerization reaction liquid obtained as described above was transferred to an autoclave equipped with a stirrer without allowing precipitation, 0.15 g of a diatomaceous earth-supported nickel catalyst (T8400 produced by Nissan Sud-Chemie; nickel support rate: 58 weight %) was added thereto, and a reaction was carried out at 200° C. and a hydrogen pressure of 4.5 MPa for 8 hours. The solution was then filtered by a filtration device equipped with a stainless steel mesh using separately added diatomaceous earth as a filtration aid, and the resultant reaction solution was dried in a vacuum dryer set to 0.13×10³ Pa or lower and 100° C. for 48 hours to yield 7.5 g of a hydrogenated ring-opened polymer. Various measurements and evaluations were performed with respect to the hydrogenated ring-opened polymer that was obtained. The results are shown in Table 2.

Comparative Example 1

In a nitrogen atmosphere, 500 parts of dehydrated cyclohexane, 0.55 parts of 1-hexene, 0.30 parts of diisopropyl ether, 0.20 parts of triisobutylaluminum, and 0.075 parts of isobutyl alcohol were loaded into a reactor and mixed at room temperature. The resultant mixture was then maintained at 55° C. while 247.5 parts of norbornene, 2.5 parts of dicyclopentadiene, and 6 parts of a 1.0% toluene solution of tungsten hexachloride were added continuously thereto over 2 hours and a polymerization reaction was carried out to yield a polymerization reaction liquid containing a ring-opened polymer. The mass ratio of norbornene units and dicyclopentadiene units in the obtained ring-opened polymer was 99:1.

The polymerization reaction liquid containing the ring-opened polymer that was obtained as described above was transferred to a pressure-resistant hydrogenation reactor, 1.0 parts of a diatomaceous earth-supported nickel catalyst (T8400 produced by Nissan Sud-Chemie; nickel support rate: 58 weight %) was added thereto, and a reaction was carried out at 160° C. and a hydrogen pressure of 4.5 MPa for 6 hours. This solution was filtered by a filtration device equipped with a stainless steel mesh using separately added diatomaceous earth as a filtration aid so as to remove the catalyst. The resultant reaction solution was poured into 3,000 parts of isopropyl alcohol under stirring so as to cause precipitation of a hydrogenated product that was then filtered off and collected. After performing washing with 500 parts of acetone, the hydrogenated product was dried in a vacuum dryer set to 0.13×10³ Pa or lower and 100° C. for 48 hours to yield 190 parts of a hydrogenated ring-opened polymer. Various measurements and evaluations were performed with respect to the hydrogenated ring-opened polymer that was obtained. The results are shown in Table 2.

Comparative Example 2

A polymerization reaction liquid containing a ring-opened polymer and a hydrogenated ring-opened polymer were obtained in the same way as in Comparative Example 1 with the exception that 250.0 parts of norbornene was used instead of 247.5 parts of norbornene and 2.5 parts of dicyclopentadiene. Various measurements and evaluations were performed with respect to the hydrogenated ring-opened polymer that was obtained. The results are shown in Table 2.

Comparative Example 3

A polymerization reaction liquid containing a ring-opened polymer was obtained in the same way as in Example 1. A large amount of acetone was poured into the polymerization reaction liquid to obtain aggregated material that was then filtered off. The resultant filtration residue was washed with methanol and was subsequently vacuum dried at 40° C. for 24 hours to yield a ring-opened polymer.

A glass reactor equipped with a stirrer was charged with 10 g of the ring-opened polymer obtained as described above, 100 g of paratoluenesulfonyl hydrazide, and 200 g of paraxylene, and these materials were heated at 125° C. for 5 hours so as to perform a hydrogenation reaction and thereby yield a hydrogenated ring-opened polymer. Various measurements and evaluations were performed with respect to the hydrogenated ring-opened polymer that was obtained. The results are shown in Table 2.

Comparative Example 4

A polymerization reaction liquid containing a ring-opened polymer and a hydrogenated ring-opened polymer were obtained in the same way as in Example 1 with the exception that the amount of the diatomaceous earth-supported nickel catalyst was changed to 0.75 g. Various measurements and evaluations were performed with respect to the hydrogenated ring-opened polymer that was obtained. The results are shown in Table 2.

Comparative Example 5

A polymerization reaction liquid containing a ring-opened polymer was obtained in the same way as in Example 10.
In addition, a hydrogenated ring-opened polymer was obtained in the same way as in Example 1 with the exception that the polymerization reaction liquid containing the ring-opened polymer obtained as described above was used and the amount of the diatomaceous earth-supported nickel catalyst was changed to 0.75 g. Various measurements and evaluations were performed with respect to the hydrogenated ring-opened polymer that was obtained. The results are shown in Table 2.

Comparative Example 6

A polymerization reaction liquid containing a ring-opened polymer was obtained in the same way as in Example 10 with the exception that 9.9 g of norbornene and 0.1 g of dicyclopentadiene were used instead of 10.0 g of norbornene. A large amount of acetone was poured into the polymerization reaction liquid to obtain aggregated material that was then filtered off. The resultant filtration residue was washed with methanol and was subsequently vacuum dried at 40° C. for 24 hours to yield a ring-opened polymer. The mass ratio of norbornene units and dicyclopentadiene units in the obtained ring-opened polymer was 99:1.

A glass reactor equipped with a stirrer was charged with 10 g of the ring-opened polymer obtained as described above, 100 g of paratoluenesulfonyl hydrazide, and 200 g of paraxylene, and these materials were heated at 125° C. for 5 hours so as to perform a hydrogenation reaction and thereby yield a hydrogenated ring-opened polymer. Various measurements and evaluations were performed with respect to the hydrogenated ring-opened polymer that was obtained. The results are shown in Table 2.

In Tables 1 and 2, shown below:
"Complex catalyst 1" indicates phenylimidotungsten(VI) tetrachloride tetrahydrofuran (tungsten(phenylimide)(tetrachloride)(tetrahydrofuran));
"Complex catalyst 2" indicates phenylimidotungsten(VI) tetrachloride diethyl ether (tungsten(phenylimide)(tetrachloride)(diethyl ether));
"Complex catalyst 3" indicates 2,6-diisopropylphenylimidotungsten(VI) tetrachloride diethyl ether (tungsten[2,6-di(i-propyl)(phenylimide)](tetrachloride)(diethyl ether));
"Complex catalyst 4" indicates complex catalyst indicated by preceding formula (V);
"Complex catalyst 5" indicates bis{3,3'-di(t-butyl)-5,5',6,6'-tetramethyl-2,2'-biphenoxy}oxymolybdenum(VI);
"Complex catalyst 6" indicates bis{3,3',5,5'-tetramethyl-2,2'-biphenoxy}oxymolybdenum(VI); and
"WC16" indicates tungsten hexachloride.

TABLE 1

|  |  |  | Example 1 | Example 2 | Example 3 | Example 4 | Example 5 |
|---|---|---|---|---|---|---|---|
| Hydrogenated ring-opened polymer | Structural units | Norbornvne [mass %] | 100 | 100 | 100 | 100 | 100 |
|  |  | Ethylidene norbornvne [mass %] | 0 | 0 | 0 | 0 | 0 |
|  |  | Dicyclopentadiene [mass %] | 0 | 0 | 0 | 0 | 0 |
|  | Ring-opening polymerization catalyst |  | Complex catalyst 1 | Complex catalyst 1 | Complex catalyst 1 | Complex catalyst 1 | Complex catalyst 2 |
|  | Weight-average molecular weight [-] |  | 60,000 | 80,000 | 98,000 | 80,000 | 75,000 |
|  | Percentage hydrogenation [%] |  | 99.7 | 99.5 | 99.4 | 99.5 | 99.3 |
|  | Proportion of meso diads [%] |  | 22 | 21 | 22 | 19 | 10 |
|  | Isomerization rate [%] |  | 3 | 5 | 5 | 15 | 1 |
|  | Melting point [° C.] |  | 137 | 136 | 134 | 131 | 135 |
|  | Nickel content [ppb] |  | 1 | 2 | 2 | 3 | 1 |
| Elongation at break [%] (ductility) |  |  | 290 | 330 | 360 | 300 | 300 |

|  |  |  | Example 6 | Example 7 | Example 8 | Example 9 |
|---|---|---|---|---|---|---|
| Hydrogenated ring-opened polymer | Structural units | Norbonvne [mass %] | 99 | 99 | 99 | 100 |
|  |  | Ethylidene norbornvne [mass %] | 1 | 0 | 0 | 0 |
|  |  | Dicyclopentadiene [mass %] | 0 | 1 | 1 | 0 |
|  | Ring-opening polymerization catalyst |  | Complex catalyst 1 | Complex catalyst 1 | Complex catalyst 3 | Complex catalyst 4 |
|  | Weight-average molecular weight [-] |  | 59,000 | 35,000 | 65,000 | 40,000 |
|  | Percentage hydrogenation [%] |  | 99.3 | 99.7 | 99.6 | 99.7 |
|  | Proportion of meso diads [%] |  | 22 | 20 | 30 | 0 |
|  | Isomerization rate [%] |  | 4 | 3 | 7 | 5 |
|  | Melting point [° C.] |  | 136 | 137 | 137 | 136 |
|  | Nickel content [ppb] |  | 1 | 1 | 2 | 1 |
| Elongation at break [%] (ductility) |  |  | 270 | 160 | 300 | 180 |

TABLE 2

|  |  |  | Example 10 | Example 11 | Comparative Example 1 | Comparative Example 2 |
|---|---|---|---|---|---|---|
| Hydrogenated ring-opened polymer | Structural units | Norbornene [mass %] | 100 | 99 | 99 | 100 |
|  |  | Ethylidene norbornene [mass %] | 0 | 0 | 0 | 0 |
|  |  | Dicyclopentadiene [mass %] | 0 | 1 | 1 | 0 |
|  | Ring-opening polymerization catalyst |  | Complex catalyst 5 | Complex catalyst 6 | WCl6 | WCl6 |
|  | Weight-average molecular weight [-] |  | 120,000 | 66,000 | 80,000 | 78,000 |
|  | Percentage hydrogenation [%] |  | 99.8 | 99.7 | 99.5 | 99.7 |
|  | Proportion of meso diads [%] |  | 100 | 81 | 50 | 50 |
|  | Isomerization rate [%] |  | 10 | 6 | 12 | 5 |
|  | Melting point [° C.] |  | 178 | 165 | 145 | 146 |
|  | Nickel content [ppb] |  | 2 | 1 | 1 | 1 |
| Elongation at break [%] (ductility) |  |  | 420 | 230 | 10 | 10 |

|  |  |  | Comparative Example 3 | Comparative Example 4 | Comparative Example 5 | Comparative Example 6 |
|---|---|---|---|---|---|---|
| Hydrogenated ring-opened polymer | Structural units | Norbornene [mass %] | 100 | 100 | 100 | 99 |
|  |  | Ethylidene norbornene [mass %] | 0 | 0 | 0 | 0 |
|  |  | Dicyclopentadiene [mass %] | 0 | 0 | 0 | 1 |
|  | Ring-opening polymerization catalyst |  | Complex catalyst 1 | Complex catalyst 1 | Complex catalyst 5 | Complex catalyst 5 |
|  | Weight-average molecular weight [-] |  | 60,000 | 60,000 | 120,000 | 120,000 |
|  | Percentage hydrogenation [%] |  | 99.8 | 99.8 | 99.6 | 99.6 |
|  | Proportion of meso diads [%] |  | 20 | 20 | 100 | 100 |
|  | Isomerization rate [%] |  | 0 | 25 | 30 | 0 |
|  | Melting point [° C.] |  | 135 | 125 | 140 | 178 |
|  | Nickel content [ppb] |  | 0 | 3 | 3 | 0 |
| Elongation at break [%] (ductility) |  |  | 20 | 10 | 20 | 30 |

It can be seen from Tables 1 and 2 that in the case of the hydrogenated ring-opened polymers of Examples 1 to 11, which each have a proportional content of norbornene-derived structural units that is not less than a specific value, a proportion of meso diads of cis-structural units (I) that is within a specific range, and an isomerization rate that is within a specific range, these hydrogenated ring-opened polymers each have excellent ductility.

In contrast, it can be seen that in the case of the hydrogenated ring-opened polymers of Comparative Examples 1 and 2, which each have a proportion of meso diads of cis-structural units (I) that is outside of a specific range, and the hydrogenated ring-opened polymers of Comparative Examples 3 to 6, which each have an isomerization rate that is outside of a specific range, these hydrogenated ring-opened polymers have poor ductility.

INDUSTRIAL APPLICABILITY

According to the present disclosure, it is possible to provide a hydrogenated ring-opened polymer that has excellent ductility. Moreover, according to the present disclosure, it is possible to provide a resin composition that can form a shaped product having excellent ductility and also to provide a shaped product that has excellent ductility.

The invention claimed is:
1. A hydrogenated ring-opened polymer comprising 90 mass % or more of norbornene-derived structural units, wherein a proportion of meso diads of structural units having a cis-1,3-cyclopentane structure indicated by formula (I), shown below,

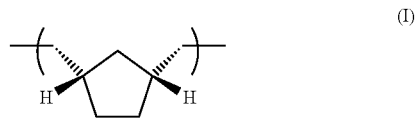

(I)

included among the norbornene-derived structural units is from 0% to not more than 30%, or alternatively, not less than 70% to 100%, and structural units having a trans-1,3-cyclopentane structure indicated by formula (II), shown below,

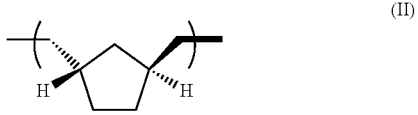

(II)

constitute a proportion of not less than 0.5% and not more than 20% among a total of the structural units having the cis-1,3-cyclopentane structure indicated by formula (I) and the structural units having the trans-1,3-cyclopentane structure indicated by formula (II).

2. The hydrogenated ring-opened polymer according to claim 1, having a weight-average molecular weight of not less than 10,000 and not more than 1,000,000.

3. The hydrogenated ring-opened polymer according to claim 1, having a nickel content of not less than 0.5 mass ppb and not more than 50 mass ppm as measured by inductively coupled plasma atomic emission spectroscopy.

4. A resin composition comprising the hydrogenated ring-opened polymer according to claim 1.

5. A shaped product formed using the resin composition according to claim 4.

\* \* \* \* \*